(12) United States Patent
Danev et al.

(10) Patent No.: US 9,941,926 B2
(45) Date of Patent: Apr. 10, 2018

(54) METHOD, APPARATUS AND COMPUTER PROGRAM FOR DETERMINING A TIME OF ARRIVAL

(71) Applicant: 3DB Access AG, Thalwil (CH)

(72) Inventors: Boris Danev, Thalwil (CH); David Barras, Sierre (CH)

(73) Assignee: 3DB Access AG (CH)

( * ) Notice: Subject to any disclaimer, the term of this patent is extended or adjusted under 35 U.S.C. 154(b) by 0 days.

(21) Appl. No.: 15/122,373

(22) PCT Filed: Feb. 26, 2015

(86) PCT No.: PCT/EP2015/000446
§ 371 (c)(1),
(2) Date: Aug. 29, 2016

(87) PCT Pub. No.: WO2015/135630
PCT Pub. Date: Sep. 17, 2015

(65) Prior Publication Data
US 2016/0373162 A1 Dec. 22, 2016

(30) Foreign Application Priority Data
Mar. 12, 2014 (CH) .......................... 372/14

(51) Int. Cl.
H04B 1/7183 (2011.01)
G01S 5/02 (2010.01)
(Continued)

(52) U.S. Cl.
CPC .......... H04B 1/7183 (2013.01); G01S 5/0221 (2013.01); G01S 13/765 (2013.01); H04L 27/1525 (2013.01)

(58) Field of Classification Search
CPC . G01S 5/0221; G01S 13/765; H04B 1/71637; H04B 1/7183; H04L 27/14; H04L 27/1525; H03D 3/007
See application file for complete search history.

(56) References Cited

U.S. PATENT DOCUMENTS 5,513,215 A * 4/1996 Marchetto .............. H04H 20/67
375/229
5,821,782 A * 10/1998 Carloni .................. H03B 21/02
327/105

(Continued)

OTHER PUBLICATIONS

International Search Report and Written Opinion of PCT/EP2015/000446, dated Jun. 22, 2015, 8 pages.

*Primary Examiner* — Michelle M Koeth
(74) *Attorney, Agent, or Firm* — Blank Rome LLP

(57) ABSTRACT

Apparatus for determining a time of arrival of a message signal comprising: a quadrature mixer (13, 14) for mixing a received message signal with the signal of a local oscillator, wherein the received message signal comprises a binary sequence modulated by binary frequency shift keying with pulses corresponding to a first value at a first frequency and with pulses corresponding to a second value at a second frequency, wherein the local oscillator has a frequency between the first frequency and the second frequency; a time of arrival detector (18) for determining a time of arrival of the message signal on the basis of the output of the quadrature mixer (13, 14).

15 Claims, 5 Drawing Sheets

(51) Int. Cl.
*G01S 13/76* (2006.01)
*H04L 27/152* (2006.01)

(56) References Cited

U.S. PATENT DOCUMENTS

| | | | | |
|---|---|---|---|---|
| 6,891,905 | B1* | 5/2005 | Malone | H04L 7/007 |
| | | | | 329/300 |
| 8,195,422 | B2* | 6/2012 | Wilcox | A61K 31/365 |
| | | | | 342/118 |
| 2005/0089120 | A1* | 4/2005 | Quinlan | H04L 27/156 |
| | | | | 375/335 |
| 2008/0165059 | A1 | 7/2008 | Karr | |
| 2008/0259896 | A1* | 10/2008 | Sahinoglu | G06K 7/10306 |
| | | | | 370/345 |
| 2009/0075590 | A1* | 3/2009 | Sahinoglu | G01S 5/0221 |
| | | | | 455/39 |
| 2011/0286505 | A1 | 11/2011 | Hedley et al. | |
| 2012/0044786 | A1* | 2/2012 | Booij | G01S 5/18 |
| | | | | 367/127 |
| 2013/0099959 | A1* | 4/2013 | Matsuo | G01S 7/282 |
| | | | | 342/189 |
| 2013/0329773 | A1* | 12/2013 | Cheng | H04L 27/0014 |
| | | | | 375/219 |

* cited by examiner

Prior Art

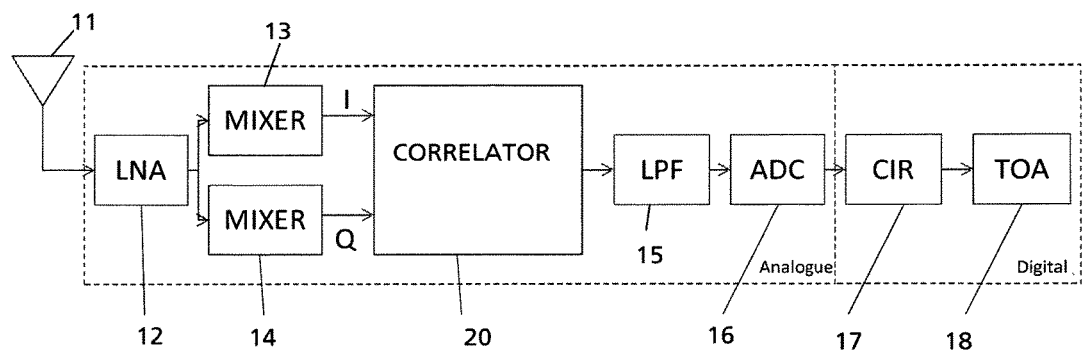
Fig. 4:
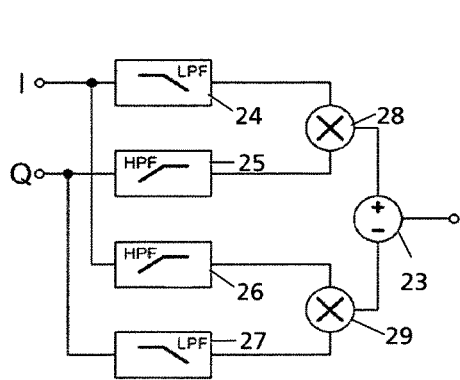 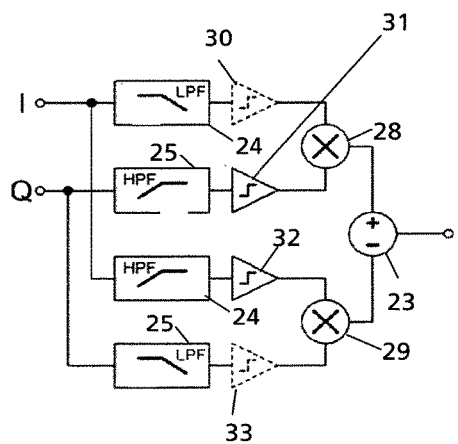
Fig. 5:          Fig. 6:

METHOD, APPARATUS AND COMPUTER PROGRAM FOR DETERMINING A TIME OF ARRIVAL

RELATED APPLICATIONS

This application is a national phase of PCT/EP2015/000446, filed on Feb. 26, 2015, which claims the benefit of Switzerland Application No. 00372/14, filed on Mar. 12, 2014. The contents of those applications are hereby incorporated by reference.

FIELD OF THE INVENTION

The invention refers to a method and an apparatus for determining a time of arrival and a key system using such an apparatus.

DESCRIPTION OF RELATED ART

Impulse-Radio Ultra-Wideband (IR-UWB) technology has gained interest since the amendments of the national and supra-national regulatory bodies allowing the unlicensed use of this technology providing various emission constraints. The large available bandwidth (>500 MHz) that UWB technology benefits from, makes it an attractive technology for communication and ranging in many fields such as asset and personnel tracking, network management, health-care and medical, security and emergency supports. The possibility to perform a centimeter-precise distance ranging is considered one of the main advantages of IR-UWB, because the higher the bandwidth of a pulse, the more perfect is the pulse and the better the time of arrival of a pulse can be detected.

A prominent example of IR-UWB technology for precise ranging is documented in the IEEE Standard 802.15.4a-2007. The standard describes a series of special processing steps to be performed to recover the time-of-arrival of a binary phase-shift keying (BPSK) and binary pulse position modulated (BPPM) pulse sequences. The standard prescribes that time-of-arrival (ToA) can be performed by either coherent or non-coherent receivers using BPSK/BPPM-modulated ultra-wide band sequences and a set of processing steps to extract the time-of-arrival at the receiver using channel impulse response (CIR). The implementation details are left to the designers.

Coherent transmission and reception of BPSK-modulated ultra-wide band sequences typically exhibits higher system performance, but requires significantly more complex receivers, therefore consumes more power. Non-coherent receivers for BPSK/BPPM pulse sequences would exhibit lower complexity, but inferior performance. Typical low-complexity systems for ToA estimation use non-coherent energy detector of BPPM or OOK modulated pulses. FIG. 1 shows such an apparatus comprising an antenna 1, a low-noise amplifier 2, a band-pass filter 3, a square-law device or rectifier 4, an integrator 5, an analogue digital converter 6 which should have a speed higher or equal than 250 MS/s, a channel impulse response (CIR) extraction 7 and a ToA estimation 8.

Such systems typically require longer integration periods and complex digital filtering for channel impulse response (CIR) extraction and ToA estimation due to non-linear transformations (square-law device). The long period of processing for CIR extraction increases the power consumption, and also significantly reduces the number of ToA measurements that such typical system can achieve.

An improved system and method is needed for precise, fast, low-complexity, and low-power ToA estimation using ultra-wide band pulse sequences.

BRIEF SUMMARY OF THE INVENTION

The object is to provide a system, an apparatus and a method to enable precise, fast, and low-power time-of-arrival estimation of ultra-wide band pulse sequences.

According to the invention, these aims are achieved by means of an apparatus and a method for determining a time of arrival according to the independent claims.

Especially, the use of a quadrature mixer for mixing a received message signal with the signal of a local oscillator has the subsequent advantages, wherein the received message signal comprises a binary sequence modulated by binary frequency shift keying with pulses corresponding to a first value at a first frequency and with pulses corresponding to a second value at a second frequency and wherein the local oscillator has a frequency between the first frequency and the second frequency. The quadrature mixer transfers the pulse at the first frequency in a pulse at a first polarity and the pulse at the second frequency in a pulse at a second polarity. This allows a very easy estimation of the corresponding value of the pulse on the basis of the polarity and thus allows an easy estimation of the time of arrival.

According to another embodiment of the invention, this is achieved by an apparatus for determining a time of arrival comprising:

a receiver for receiving a message signal containing a binary sequence modulated by binary frequency shift keying with a sequence of pulses at two different frequency bands;

an analogue demodulator for analogously demodulating the sequence of pulses at a first frequency band and at a second frequency band into a sequence of first pulses and second pulses, wherein the pulses in the first frequency band are analogously demodulated into the first pulses, and the pulses in the second frequency band are analogously demodulated into the second pulses, an analogue-to-digital converter for converting the demodulated sequence of the first pulses and the second pulses into a digital signal with the sequence of the first pulses and the second pulses; and time of arrival detector for determining a time of arrival of the message signal on the basis of the digital signal with the sequence of first pulses and second pulses.

This embodiment has the advantage that the received message signal is demodulated in the analogue domain and only the time of arrival estimation has to be performed in the digital domain. This reduces the power consumption in the digital domain. In addition, this allows using ADCs with lower complexity.

According to another embodiment of the invention, this is achieved by an apparatus for determining a time of arrival comprising:

a receiver for receiving a message signal containing a binary sequence modulated by binary frequency shift keying with a sequence of pulses at two different frequency bands;

a demodulator for demodulating the sequence of pulses at a first frequency band and at a second frequency band into a sequence of pulses at a first polarity and a second polarity, wherein the pulses in the first frequency band are demodulated into pulses with the first polarity, and the pulses in the second frequency band are demodulated into the pulses with the second polarity; and a time of arrival detector for determining a time of arrival of the message signal on the basis of the digital signal with the sequence of first pulses and second pulses.

By converting the pulses at two different frequencies into pulses at two different polarities, an easy way to determine the value of each pulse and of determining the time of arrival is achieved.

The dependent claims refer to further embodiments of the invention.

In one embodiment, the quadrature mixer is configured to output an in-phase component or a quadrature component of the received message signal. This separation between the in-phase component and the quadrature component allows to distinguish the pulses received at the first frequency and the pulses received at the second frequency in a better way.

In one embodiment, the quadrature mixer is configured to output an in-phase component of the received message signal, wherein the apparatus for determining the time of arrival comprising further an additional quadrature mixer for outputting a quadrature component of the received message signal by mixing the received message signal with the signal of a local oscillator having the same frequency as the local oscillator of the quadrature mixer with a phase offset of ninety degrees; and a correlator comprising a cross-correlator configured to mix the output of the quadrature mixer and the output of the additional quadrature mixer. This arrangement provides a better demodulation of the pulse envelop for the received pulse.

In one embodiment, the correlator comprises delay means for delaying the phase of the output of the quadrature mixer and/or for delaying the phase of the output of the additional quadrature mixer before entering the cross-correlator. This single-correlator arrangement allows to provide a good estimation of the pulse envelope for the received pulse, with a polarity depending on the frequency of the received pulse.

In one embodiment, the correlator comprises further an additional cross-correlator configured to also mix the output of the quadrature mixer and the output of the additional quadrature mixer; an additional delay means for delaying the phase of the output of the quadrature mixer and/or for delaying the phase of the output of the additional quadrature mixer before entering the additional cross-correlator; and a combiner for combining the output of the cross-correlator and the additional cross-correlator. This balanced quadricorrelator arrangement allows a very precise estimation of the envelope of the received RF pulse with the polarity of the pulse depending on the frequency of the received RF pulse.

In one embodiment, the combiner subtracts the output of the additional cross-correlator from the output of the cross-correlator.

In one embodiment, the delay means and/or the additional delay means is configured to move the relative phase of the output of the quadrature mixer and of the output of the additional quadrature mixer by 90°.

In one embodiment, the delay means is configured to move the relative phase of the output of the quadrature mixer and of the output of the additional quadrature mixer in a first direction and/or the additional delay means is configured to move the relative phase of the output of the quadrature mixer and of the output of the additional quadrature mixer in a second direction.

In one embodiment, the delay means comprises a first delayer configured to shift the phase of the output of the quadrature mixer by 45° in a first direction and a second delayer configured to shift the phase of the output of the additional quadrature mixer by 45° in a second direction, wherein the output of first delayer and the output of the second delayer is mixed in the cross-correlator; and/or the additional delay means comprises a third delayer configured to shift the phase of the output of the quadrature mixer by 45° in the second direction and a fourth delayer configured to shift the phase of the output of the additional quadrature mixer by 45° in the first direction, wherein the output of third delayer and the output of the fourth delayer is mixed in the additional cross-correlator.

In one embodiment, the first delayer is a low pass filter removing the frequencies above an offset frequency, wherein the second delayer is a high pass filter removing the frequencies below the offset frequency, the third delayer is a high pass filter removing the frequencies above the offset frequency, wherein the second delayer is a low pass filter removing the frequencies below the offset frequency, wherein the offset frequency is half of the frequency difference between first frequency and the second frequency.

In one embodiment, the correlator is a balanced quadricorrelator.

In one embodiment, the correlator comprises a comparator between the delay means and the cross-correlator with the output of the quadrature mixer after the delay means as input and/or a comparator between the delay means and the cross-correlator with the output of the additional quadrature mixer after the delay means as input; and an additional comparator between the additional delay means and the additional cross-correlator with the output of the quadrature mixer after the additional delay means as input and/or an additional comparator between the additional delay means and the additional cross-correlator with the output of the additional quadrature mixer after the additional delay means as input; wherein the comparator and the additional comparator is configured to output a first value, if the input signal is below a threshold and to output a second value, if the input signal is above a threshold. This arrangement has the advantage that the pulse is demodulated in a linear way and improves the performance of the time of arrival detection.

In one embodiment, the apparatus for determining the time of arrival comprises further a first analogue to digital converter and a second analogue to digital converter between the delay means and the cross-correlator for digitalizing the output of the quadrature mixer after the delay means and the output of the additional quadrature mixer after the delay means; and/or an additional first analogue to digital converter and an additional second analogue to digital converter between the additional delay means and the additional cross-correlator for digitalizing the output of the quadrature mixer after the additional delay means and the output of the additional quadrature mixer after the additional delay means. This embodiment allows using ADCs with lower resolution.

In one embodiment, the apparatus for determining the time of arrival comprises further an analogue digital converter between the correlator and the time of arrival detector. This has the advantage that only one ADC is necessary for digitalizing the demodulated signal with the positive and negative pulses at the same frequency. Since the positive and negative pulses have the same frequency components, the resolution of the ADC can be reduced compared to an ADC arranged before the demodulation (i.e., after the quadrature mixers).

In one embodiment, the apparatus for determining the time of arrival comprises a channel impulse response extractor configured to determine the channel impulse response on the basis of number of the last pulses received and of the number of pulses expected to receive, wherein the time of arrival detector is configured to determine the time of arrival of the message signal on the basis of the determined channel impulse response.

In one embodiment, the channel impulse response extractor is configured to determine the channel impulse response by determining the accumulated pulses of the number of last pulses, wherein each pulse is multiplied by its expected polarity.

BRIEF DESCRIPTION OF THE DRAWINGS

The invention will be better understood with the aid of the description of an embodiment given by way of example and illustrated by the figures, in which:

FIG. 4 shows a first embodiment of an apparatus for determining the time of arrival;

FIG. 5 shows a first embodiment of a correlator;

FIG. 6 shows a second embodiment of a correlator;

DETAILED DESCRIPTION OF POSSIBLE EMBODIMENTS OF THE INVENTION

Figure 1:
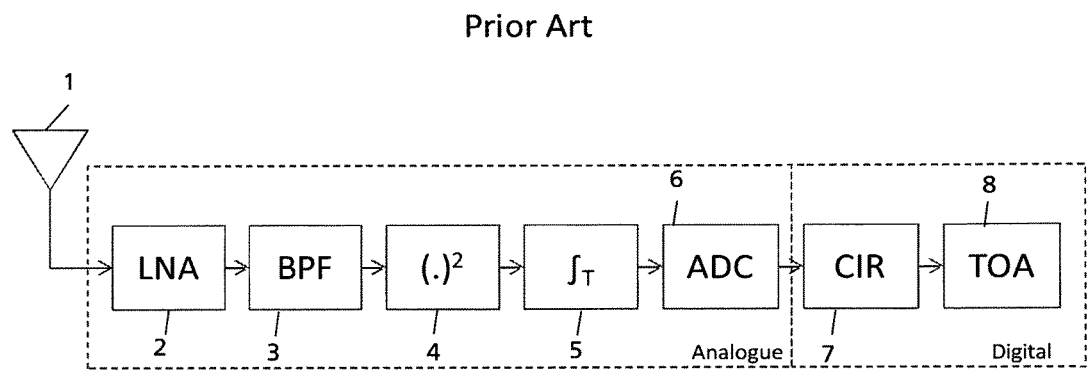
FIG. 1 shows an apparatus for determining the time of arrival of the prior art.
Figure 2:
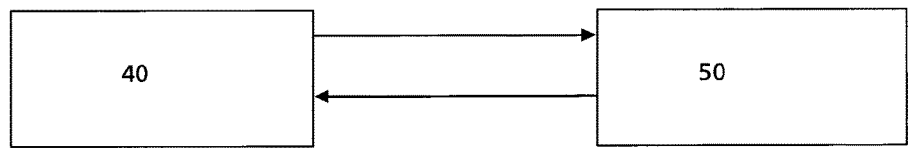
FIG. 2 shows a key system.

FIG. 2 shows an embodiment of a key system. The key system comprises a base device 40 and a key device 50.

The base device 40 is configured to send out periodically challenge messages to the key device 50 and to receive a challenge response from the key device 50, when a key device 50 receives one challenge message and replies to it by the challenge response. A challenge message comprises a binary sequence. In one embodiment, the binary sequence contains a preamble of a fixed binary pattern, e.g. alternating zeros and ones, and challenge sequence, preferably a random binary sequence. In one embodiment, the random sequence changes each challenge message or after a certain number of challenge messages. The challenge response contains also a binary sequence with a preamble and the challenge sequence manipulated on the basis of a cryptographic key stored in the key device 50 and in the base device 40. The cryptographic key is in one embodiment a 128-bit key. The cryptographic key is in one embodiment a symmetric cryptographic key. However, also a private and public key pair could be used. The base device 40 is configured to check the validity of the manipulated challenge sequence on the basis of the challenge sequence and/or of the encrypted key. In one embodiment, this can be achieved by decrypting the manipulated challenge sequence by the symmetric cryptographic key or by encrypting the challenge sequence with the symmetric cryptographic key, if the challenge sequence was encrypted by said symmetrical cryptographic key. In another embodiment, this can be achieved by any other established credentials. The challenge response can comprise further commands which should be performed by the base device 40. Optionally, the challenge response can comprise further information for determining the time of flight from the base device 40 to the key device 50 and/or from the key device 50 to the base device 40, e.g. the time of arrival of the challenge message at the key device 50 and/or the time of departure of the challenge response from the key device 50 and/or the difference between the time of arrival of the challenge message at the key device 50 and the time of departure of the challenge response from the key device 50.

The key device 50 is configured to receive the challenge message from the base device 40 and to send a challenge response comprising a binary sequence. Preferably, the binary sequence comprises a preamble and/or the challenge sequence of the challenged message manipulated on the basis of said cryptographic key, e.g. by authenticating and/or encrypting said challenge sequence by said key. In one embodiment, the key device 50 is further configured to send commands with the challenge response, like e.g. open/close door, open/close second door/window, start/stop engine, make noise/light, etc. In one embodiment and as explained before, the key device 50 is further configured to send with the challenge response further information for determining the time of flight from the base device 40 to the key device 50 and/or from the key device 50 to the base device 40. In one embodiment, the key device 50 is configured to measure the time of arrival of the challenge message and to send back the challenge response to the base device 40 after a known or predefined or fixed time period after this arrival of the challenge message from the base device 40.

At least one of the base device 40 and the key device 50 comprise an apparatus for determining the time of arrival of the challenge message and/or challenge response as explained in more detail below. The base device 40 is configured to authenticate the challenge response on the basis of the validity of the manipulated challenge sequence and on the time of arrival of the challenge response and/or on the time of arrival of the challenge message at the key device 50. The time of arrival of the challenge response at the base device 40 and/or the time of arrival of the challenge message at the key device 50 allows determining the distance of the key device 50 from the base device 40.

In one embodiment, the base device 40 and the key device 50 comprise each an apparatus for determining the time of arrival of the challenge message and/or challenge response. In this embodiment, the challenge response contains information about the time of arrival of the challenge message at the key device 40 and the time of departure of the challenge response from the key device 40 or about the time difference between the time of arrival of the challenge message at the key device 40 and the time of departure of the challenge response from the key device 40. The base device 40 is configured in this embodiment to authenticate the challenge response on the basis of the validity of the manipulated challenge sequence, on the time of arrival of the challenge response at the base device 40, on the time of sending the challenge message from the base device 40, the time of arrival of the challenge message at the key device 50 and the time of departure of the challenge response from the key device 50. The time of arrival of the challenge message at the key device 50 and the time of departure of the challenge response from the key device 50 could be replaced by its time difference. Thus, the time of flight between the base device 40 and the key device 50 and the time of flight between the key device 50 and the base device 40 are determined individually.

In one embodiment, the base device 40 and the key device 50 comprise each an apparatus for determining the time of arrival of the challenge message and/or challenge response. In this embodiment, the key device 50 is configured to measure the time of arrival of the challenge message and to send back the challenge response message to the base device 40 after a known or predefined or fixed time period after the arrival of the challenge message. The base device 40 is configured in this embodiment to authenticate the challenge response on the basis of the validity of the manipulated challenge sequence, on the time of arrival of the challenge response at the base device 40, on the time of sending the challenge message from the base device 40 and on the fixed time the key device 50 waits before it resends the challenge response to the base device 40.

In one embodiment, only the base device 40 contains an apparatus for determining the time of arrival of the challenge response. In this embodiment, the challenge response contains information about the time of departure of the challenge response from the key device 50. The base device 40 is configured in this embodiment to authenticate the challenge response on the basis of the validity of the manipulated challenge sequence, the time of arrival of the challenge response at the base device 40 and the time of departure of the challenge response from the key device 50.

In one embodiment, only the key device 50 contains an apparatus for determining the time of arrival of the challenge response. In this embodiment, the challenge response contains information about the time of arrival of the challenge message at the key device 50. The base device 40 is configured in this embodiment to authenticate the challenge response on the basis of the validity of the manipulated challenge sequence, the time of arrival of the challenge message at the key device 50 and the time of departure of the challenge message from the base device 40.

In another embodiment, only the base device 40 contains an apparatus for determining the time of arrival of the challenge response.

The base device 40 is configured in this embodiment to authenticate the challenge response on the basis of the validity of the manipulated challenge sequence, the time of arrival of the challenge response at the base device 40 and the time of departure of the challenge message from the base device 40. In this embodiment, the time of processing in the key device 50 must be known with a negligible error or must be short enough that the determination of the time of flight is exact enough for the present embodiment.

An example of a base device 40 is a vehicle like e.g. a car. However, the invention can also be used for base devices 40 like buildings, doors, garages, mobile payment terminals, or any other device needing authentication for access control based on a secure physical distance measurement.

Figure 3:
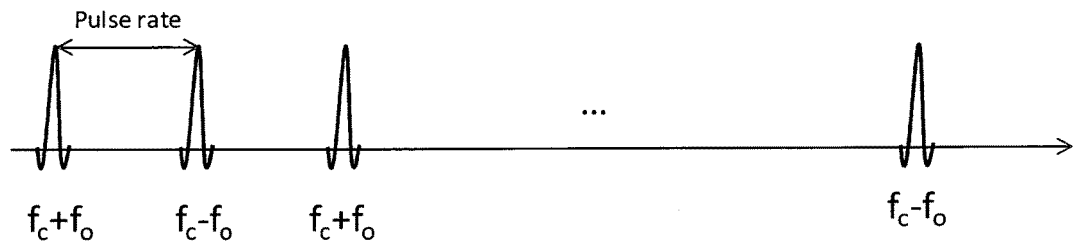
FIG. 3 shows a sequence of BFSK pulses.

FIG. 3 shows an embodiment of a binary sequence of a message transmitted by a sequence of pulses modulated by binary frequency shift keying (BFSK). Each bit is either a first value, e.g. 0, or a second value, e.g. 1. Each bit with a first value is transmitted by a pulse carried by a first frequency and each bit with a second value is transmitted by a pulse carried by a second frequency.

In one embodiment, the pulses are transmitted at a fixed pulse rate (i.e. periodic) such that the receiver can determine the sequence of bits (binary sequence) by the sequence of pulses carried at the first and second frequency. In one embodiment, the pulses are transmitted for a time period being shorter than the time period between two pulses (e.g. inverse of the pulse rate), preferably shorter than 50% of the time period between two pulses, even more preferably shorter than 10% of the time period between two pulses, even more preferably shorter than 5% of the time period between two pulses. For example, if the pulses are sent every 200 ns, the pulse duration is only 4 ns. However, also non-periodic transmission schemes are possible (such as pulse position modulation schemes).

In one embodiment, the message is transmitted referenced to a centre frequency $f_c$, defining the frequency of the particular channel. The pulses indicating the first value are sent at a first frequency $f_c-f_0$ below the centre frequency with a first frequency bandwidth defining a first frequency band. The pulses indicating the second value are sent are sent at a second frequency $f_c+f_0$ above the centre frequency with a second frequency bandwidth defining a second frequency band, where $f_0$ is the offset frequency from the centre frequency $f_c$. In one embodiment, the first and second frequency and the centre frequency are in the frequency range of the UWB and/or the composite spectrum of the first and the second frequency bandwidths shall meet the UWB bandwidth requirements (>500 MHz). In one embodiment, the first and second frequency bands are between 6 and 8.5 GHz. In one embodiment, the centre frequency of the particular channel is 6.4 GHz and the offset-frequency is $f_0$=150 MHz so that the first and second frequency bands are at 6.25 GHz and at 6.65 GHz. In one embodiment, several channels can be used at several centre frequencies within the UWB band. For each channel used, an independent ToA estimation is done and then the best or the average estimation is used for the ToA. Alternatively, the result of the received different channels is combined before the time of arrival estimation. In one embodiment, the bandwidth of each pulse is larger than 250 MHz, such that the composite bandwidth is larger than the minimum UWB bandwidth. Preferably, the offset frequency $f_0$ is larger than half of the first bandwidth and/or the second bandwidth.

One realization of a sequence of pulses is a periodic sequence at a given pulse rate, where the carrier frequency of the pulses alternates as shown in FIG. 3. It can be well seen that the pulse is only sent out for a short time, i.e. for most of the time between two pulses no information is sent out. For determining the time of arrival, it is suitable to use a very easy preamble signal of the message. In one embodiment, the preamble consists of a fixed number of alternating first and second values like 010101010101 . . . . In one embodiment, the fixed number is 128. However, any other known sequence could be used to determine the time of arrival.

In FIG. 4, an embodiment for an apparatus for determining the time of arrival of a message with a sequence of pulses modulated with BFSK is shown. The apparatus comprises an antenna 11, a low-noise amplifier 12, a first quadrature mixer 13, a second quadrature mixer 14, a correlator 20, a low pass filter 15, an analogue to digital converter 16, a channel impulse response (CIR) detector 17 and a ToA detector 18.

The antenna 11 is configured to receive radio waves at the frequency band containing the first frequency band and the second, frequency band, i.e. containing all channels used. The optional low noise amplifier 12 is configured to amplify the signal received at the antenna 11.

Figures 10, 11:
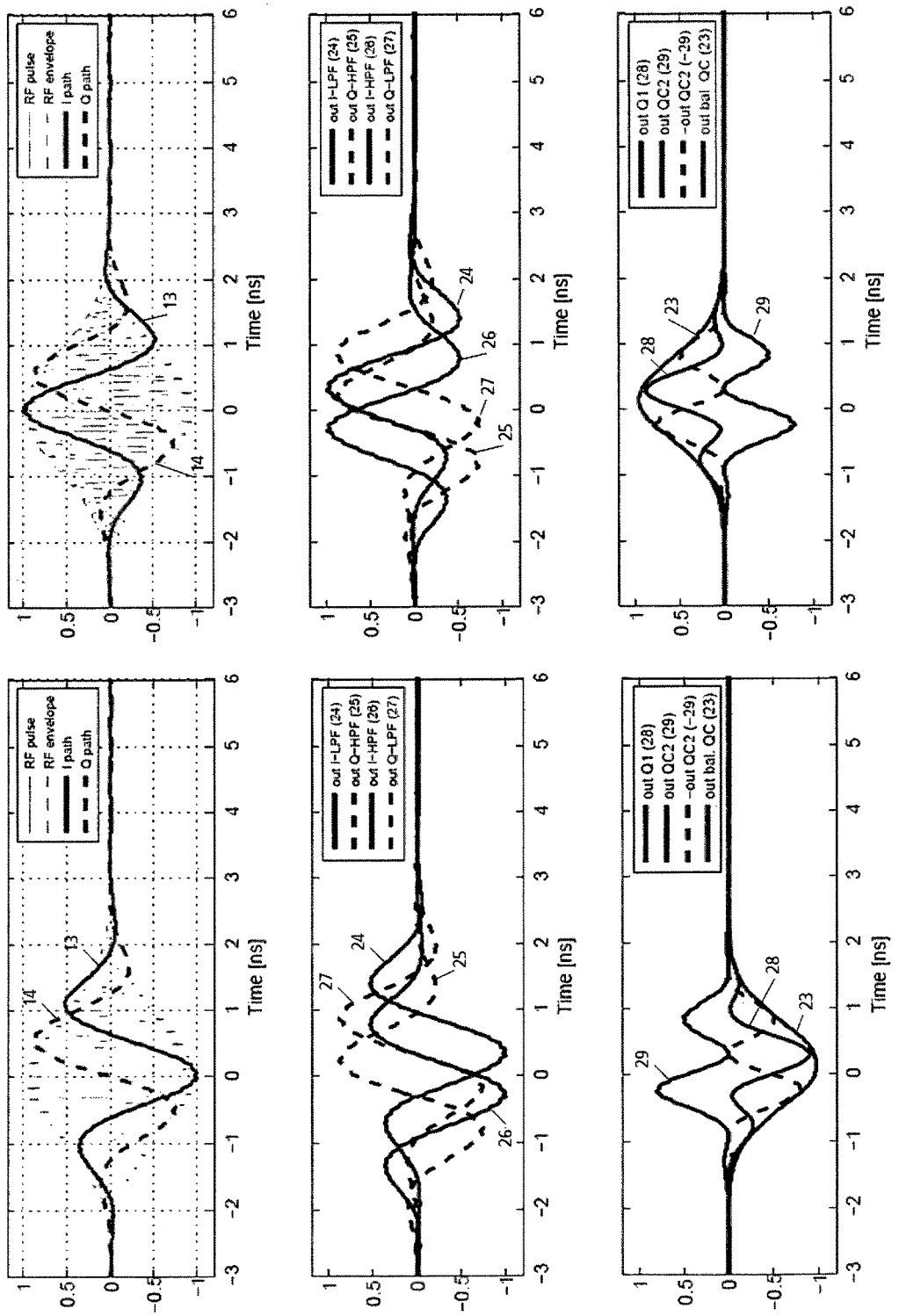
FIG. 10 shows the output signals of various means of the apparatus for determining the invention for a pulse at the first frequency.
FIG. 11 shows the output signals of various means of the apparatus for determining the invention for a pulse at the second frequency.

The first quadrature mixer 13 and the second quadrature mixer 14 select the desired centre frequency/channel $f_c$ by mixing the output of the low noise amplifier 12 with a periodic signal from a local oscillator running at centre frequency $f_c$ of the desired channel (direct conversion receiver). In one embodiment, the local oscillator is not synchronized with the received message signal (non-coherent receiver). For subsequent demodulation of the BFSK modulation, the quadrature mixers 13 and 14 shall provide signals in quadrature. Due to the wide bandwidth of the UWB channel (e.g. covering 6 to 8.5 Ghz), quadrature cannot be easily generated on the signal path. Therefore, quadrature mixers 13 and 14 use a quadrature local oscillator. The phase of the local oscillator of the second quadrature mixer 14 has a phase-offset of 90° compared to the local oscillator of the first quadrature mixer 13. Optionally, the output of the low noise amplifier 12 is mixed to an intermediate frequency $f_i$ (not shown). In this case, the local oscillator of the first and second quadrature mixer 13 and 14 has the frequency of the intermediate centre frequency $f_i$. Therefore, the first quadrature mixer 13 and the second quadrature mixer 14 mix the first frequency $f_c-f_0$ (or $f_i-f_0$) of down to $-f_0$ and the second frequency $f_c+f_0$ (or $f_i-f_0$) down to $f_0$. This has the consequence that the two quadrature mixers 13 and 14 transfer either pulses at the first frequency $f_c-f_0$ and pulses at the second frequency $f_c+f_0$ to a common frequency $f_0$. FIG. 10 shows in the first row a RF pulse received at the first frequency (thin continuous line), its RF pulse envelope (thin dashed line), the output of the first quadrature mixer 13 for the RF pulse received at the first frequency and the output of the second quadrature mixer 14 for the RF pulse received at the first frequency. FIG. 11 shows in the first row a RF pulse received at the second frequency (thin continuous line), its RF pulse envelope (thin dashed line), the output of the first quadrature mixer 13 for the RF pulse received at the second frequency and the output of the second quadrature mixer 14 for the RF pulse received at the second frequency. As can be seen in FIGS. 10 and 11 in the respective first rows, the output of the first quadrature mixer 13 for the RF pulse received at the first frequency is a negative pulse due to the negative offset frequency, and the output of the first quadrature mixer 13 for the RF pulse received at the second frequency is a positive pulse. Therefore, the first quadrature mixer 13 converts the two pulses at different frequencies at pulses with the same frequency, but with different polarity. This could already by used for determining the time of arrival. However, since the output of the first quadrature mixer 13 has also two minima (or two maxima in the case of the inverted pulse) and the pulse envelope is quite different from the pulse envelope of the RF pulse, this would lead to a higher error than in the present embodiment. The first quadrature mixer 13 outputs the in-phase components of the received signal around the offset frequency whose polarity depends on the frequency of the incoming pulse (positive or negative offset frequency). The output of the second quadrature mixer 14 outputs the quadrature phase components of the received signal around the offset frequency, shifted compared to the output of the first quadrature mixer 13 by +90° or −90° according to the frequency of the incoming pulse (i.e. positive or negative frequency offset). The separation of the in-phase components from the quadrature components enables the discrimination of the positive and the negative offset frequency. Therefore, the two quadrature mixers 13 and 14 transform the sequence of pulses at the first frequency and the second frequency in quadrature pulses both around the offset frequency $f_0$. The absolute phase of the output of the first quadrature mixer 13 and/or of the second quadrature mixer 14 compared to the RF pulse depends on the phase of the local oscillator in relation to the phase of the incoming RF pulse. In one embodiment, the phase of the local oscillator in relation to the phase of the incoming RF pulse are not coherent with the consequence that absolute phase of the output of the first quadrature mixer 13 and/or of the second quadrature mixer 14 compared to the RF pulse is random.

Figure 7:
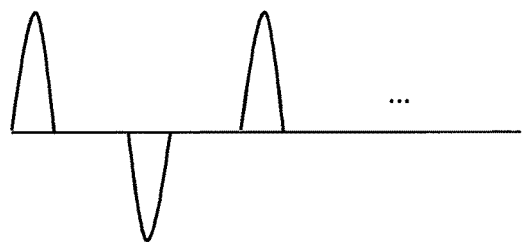
FIG. 7 shows a sequence of pulses output of the first embodiment of the analogue demodulator.

The correlator 20 is configured to process the output of the first quadrature mixer 13 and/or of the second quadrature mixer 14 and mix them together. Preferably, the correlator 20 changes the relative phase between the in-phase component I and the quadrature component Q before mixing those components. Preferably, the relative phase between the in-phase component I and the quadrature component Q is shifted by 90°. The phase delay refers here to the phase delay in relation to the off-set frequency $f_0$. The correlator 20 is further configured to transform the output of the first quadrature mixer 13 and/or of the second quadrature mixer 14 for the first frequency and the second frequency into a first type of pulse and a second type of pulse, respectively. In one embodiment, the first pulse type is positive and the second pulse type is negative as shown in FIG. 7, i.e. the first and second pulse types distinguish only in polarity. However, in an alternative embodiment the pulse type could also distinguish in amplitude. In one embodiment, the correlator 20 demodulates the pulses such that the pulse envelope and/or amplitude is/are preserved. A detailed embodiment of the correlator 20 will be described in the following in relation with FIGS. 5, 10 and 11.

FIG. 5 shows a first embodiment of a correlator 20. The correlator 20 is realized as a balanced quadricorrelator. The first embodiment of the correlator 20 comprises a first delayer 24, a second delayer 25, a third delayer 26, a fourth delayer 27, a first cross-correlator 28, a second cross-correlator 29 and a combiner 23. FIGS. 10 and 11 show in the second and third row the output of the four delayers 24 to 27 and of the cross-correlators 28 and 29 for pulses received at the first frequency (FIG. 10) and pulses received at the second frequency (FIG. 11).

The first delayer 24 is configured to shift the phase of the pulse of the in-phase signal I by +45° (referring to the offset frequency). The first delayer 24 is realized as a low pass filter with the cut off frequency at the offset frequency. The first delayer 24 is fed with the output of the first quadrature mixer 13. The second delayer 25 is configured to shift the phase of the pulse of the quadrature signal Q by −45° (referring to the offset frequency). The second delayer 25 is realized as a high pass filter with the cut off frequency at the offset frequency. The second delayer 25 is fed with the output of the second quadrature mixer 14. The cross-correlator 28 multiplies the output of the first delayer 24 and the output of the second delayer 25. The third delayer 26 is configured to shift the phase of the pulse of the in-phase signal I by −45° (referring to the offset frequency). The third delayer 26 is realized as a high pass filter with the cut off frequency at the offset frequency. The third delayer 26 is fed with the output of the first quadrature mixer 13. The fourth delayer 27 is configured to shift the phase of the pulse of the quadrature signal Q by +45° (referring to the offset frequency). The fourth delayer 27 is realized as a low pass filter with the cut off frequency at the offset frequency. The fourth delayer 27 is fed with the output of the second quadrature mixer 14. The second cross-correlator 29 multiplies the output of the third delayer 26 and the output of the fourth delayer 27. The combiner 23 is configured to build the difference between the output of the second cross-correlator 29 and the output of the first cross-correlator 28.

For pulses received at the first frequency as can be seen in FIG. 10 in the second row, the in-phase signal I and the quadrature signal Q after the first delayer 24 and the second delayer 25, are shifted such that the minimum of the pulse in the in-phase signal (minimum corresponds to the peak of the negative pulse) lays at the maximum of the pulse in the quadrature signal Q. Therefore for pulses received at the first frequency as can be seen in FIG. 10 in the third row, the cross-correlator 28 outputs a negative pulse. For pulses received at the first frequency as can be seen in FIG. 10 in the second row, the in-phase signal I and the quadrature signal Q after the third delayer 26 and the fourth delayer 27, are shifted relatively to each other such that the maximum of the pulse in the in-phase signal I lays at the maximum of the pulse in the quadrature signal Q and/or that the minimum of the pulse in the in-phase signal I lays at the minimum of the pulse in the quadrature signal Q. Therefore for pulses received at the first frequency as can be seen in FIG. 10 in the third row, the cross-correlator 29 outputs a positive pulse.

For pulses received at the second frequency as can be seen in FIG. 11 in the second row, the in-phase signal I and the quadrature signal Q after the first delayer 24 and the second delayer 25, are shifted such that the maximum of the pulse in the in-phase signal lays at the maximum of the pulse in the quadrature signal Q and/or that the minima of the pulse in the in-phase signal I lay at the minima of the pulse in the quadrature signal Q. Therefore for pulses received at the second frequency as can be seen in FIG. 11 in the third row, the cross-correlator 28 outputs a positive pulse. For pulses received at the second frequency as can be seen in FIG. 11 in the second row, the in-phase signal I and the quadrature signal Q after the third delayer 26 and the fourth delayer 27, are shifted relatively to each other such that the maximum of the pulse in the in-phase signal I lays at the minimum of the pulse in the quadrature signal Q and/or that the minima of the pulse in the in-phase signal I lay at the maxima of the pulse in the quadrature signal Q. Therefore for pulses received at the second frequency as can be seen in FIG. 11 in the third row, the cross-correlator 29 outputs a negative pulse.

The combiner 23 provides the difference between the output of the first cross-correlator 28 and the output of the second cross-correlator 29. This provides for the pulse received at the first frequency a negative pulse which corresponds nearly to the envelop of the received RF pulse (see FIG. 10, third row) and for the pulse received at the second frequency a positive pulse which corresponds nearly to the envelop of the received RF pulse (see FIG. 11, third row). Therefore, the two-quadrature mixers 13 and 14 in combination with the balanced quadricorrelator 20 provide a very effective demodulation of the pulses at the first and second frequency into a positive pulse and a negative pulse at the same frequency, respectively with nearly the same pulse envelop as the received RF pulse. This is even possible with non-coherent receivers.

Figure 12:
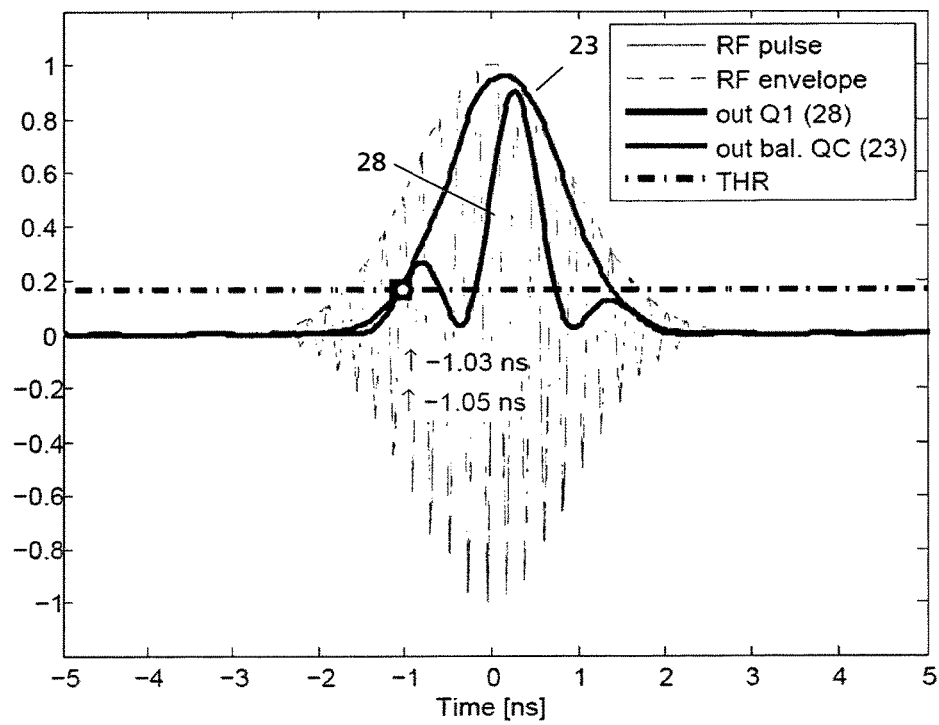
FIG. 12 shows the output of a balanced quadricorrelator and of a single correlator for a pulse at the first frequency.
Figure 13:
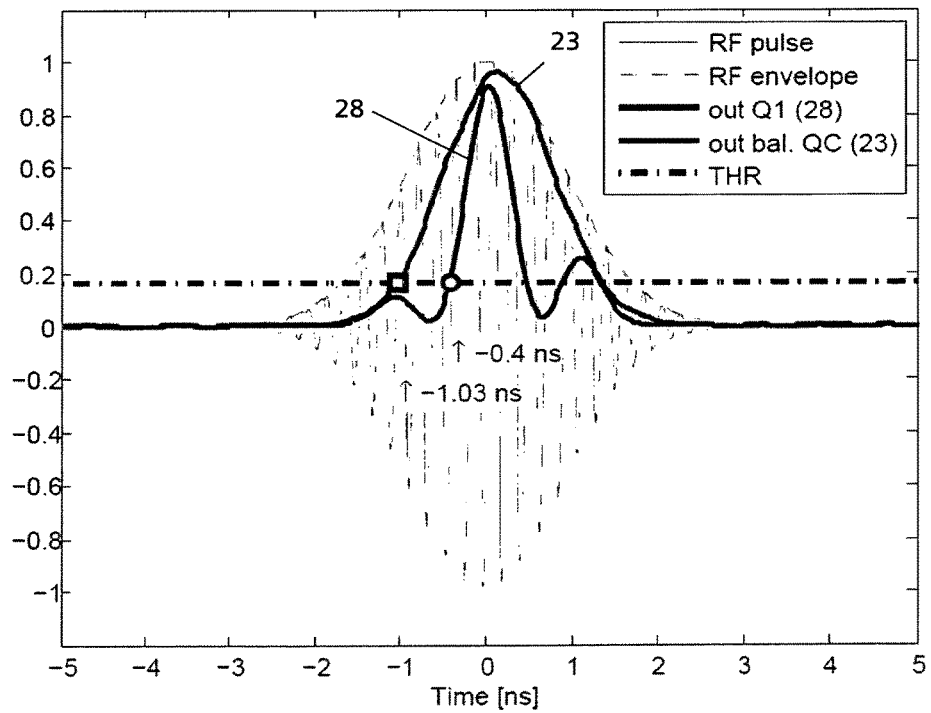
FIG. 13 shows the output of a balanced quadricorrelator and of a single correlator for a pulse at the second frequency.

However, the invention is not restricted to the use of a balanced quadricorrelator. The correlator 20 could also be realized as a single-correlator like the output of the first or second cross-correlator 28 or 29. The output of the first cross-correlator 28 and/or the output of the second cross-correlator 29 provide(s) a rough image of the envelope of the incoming quadrature pulse with a polarity depending on the frequency of the incoming pulse. While the first cross-correlator 28 outputs a negative pulse for the first frequency and a positive pulse for the second frequency, the second cross-correlator 29 outputs a positive pulse for the first frequency and a negative pulse for the second frequency. FIGS. 12 and 13 for two different absolute phase offsets between the transmitter and the receiver and for pulse of the first frequency the absolute value of the output of the single correlator 28 and the output of the balanced quadricorrelator 23 with the envelop of the incoming RF pulses. While the output corresponds nearly to the envelop of the incoming RF pulses and allows the determination of the time of arrival with a low error, the output of the single correlator 28 has a ripple frequency which infers a higher error for the time of arrival estimation. But the estimation of the time of arrival with the single correlator 28 or 29 is also possible. The advantage of the balanced quadricorrelator is that the envelope of the incoming RF pulse is almost perfectly restored without ripple effect that degrades the accuracy of the time of arrival estimation. The ripple of the single correlator 28 or 29 depends of the absolute phase relationship between the transmitted carrier and the local oscillator at the receiver and therefore cannot be perfectly synchronized. This ripple has a frequency component at twice the offset frequency and generates jitter of the ToA measurement. Furthermore, the balanced quadricorrelator is not compressing or saturating the signal as other digital- or counter-based BFSK demodulators do. Therefore, its output can be used precisely and robustly determine the Time of Arrival of at least a single incoming BFSK pulse. Therefore, the balanced quadricorrelator allows also a nearly perfect restoration of the envelop of the incoming RF pulse also for non-coherent receivers.

The low pass filter 15 removes higher frequencies from the output of the correlator 20 and operates as an anti-aliasing filter for the subsequent ADC 16. In one embodiment, the low pass filter 15 removes all the frequencies above twice the sampling frequency of the ADC in order to prevent aliasing. However, the low pass filter 15 is not essential for the present invention and can be omitted. The analogue digital converter (ADC) 16 is configured to digitalize the output of the correlator 20 and/or of the low pass filter 15. In one embodiment, the ADC is a high-speed n-bit analogue-to-digital converter (ADC) for digital sampling where n should be preferably >=4, preferably 5. For a nanosecond precision in the ToA estimation, the speed of the ADC should be above 500 MS/s. The fact that the correlator 20 demodulates the two frequency pulses in two types of pulses (preferably at different polarities) at the same allows the use of a single ADC. Since here only half of the original bandwidth at a low frequency $f_0$ is used, the sampling resolution of the ADC can be chosen two times lower. This reduces the power, the size and the complexity for the ADC. In addition, in the present solution only one ADC is necessary, since a second ADC component as it is normal after two quadrature mixers is not necessary.

The channel impulse response (CIR) detector 17 is configured to process the digitally sampled demodulated sequence of pulses in the digital domain in order to extract the channel impulse response (CIR). The CIR is extracted on the basis of the expected received binary sequence. As explained above, preferably the preamble of a message, preferably a sequence of alternating value pulses is used to detect the CIR. This could be done by computing the accumulated pulses of a certain number of last pulses, wherein each pulse type expected in the expected binary sequence is multiplied by its polarity accordingly. In the above above-described example with periodic polarity change, every second pulse is a negative pulse, and therefore every pulse at an unequal position should be multiplied by −1. This yields the following equation $$CIR = \Sigma_{n=1}^{N}\{(-1)^n \cdot DemPulse(n)\}.$$

The actual CIR is calculated by accumulating the sample points of the last N pulses, i.e. of the previous $NT_P$ time with $T_P$ being the time between two pulses (inverse of pulse rate). In the example, after each $T_P$ time of the accumulated samples is changed in order to receive a maximum CIR energy, when the expected binary sequence is received. For other expected binary sequences with N pulses and values value(n) for n=1, . . . , N the OR could be $$CIR=\Sigma_{n=1}^{N}\{(-1)^{value(n)} \cdot DemPulse(n)\}.$$

in order to multiply every pulse with its polarity. That means a plurality of pulses of a sequence is summed up, wherein the negative pulses are multiplied by −1 in order to receive a good estimator for the CIR. Another method for the CIR would consist of correlating the demodulated sequence of pulses with a known template. Or both methods could be combined.

Figure 8:
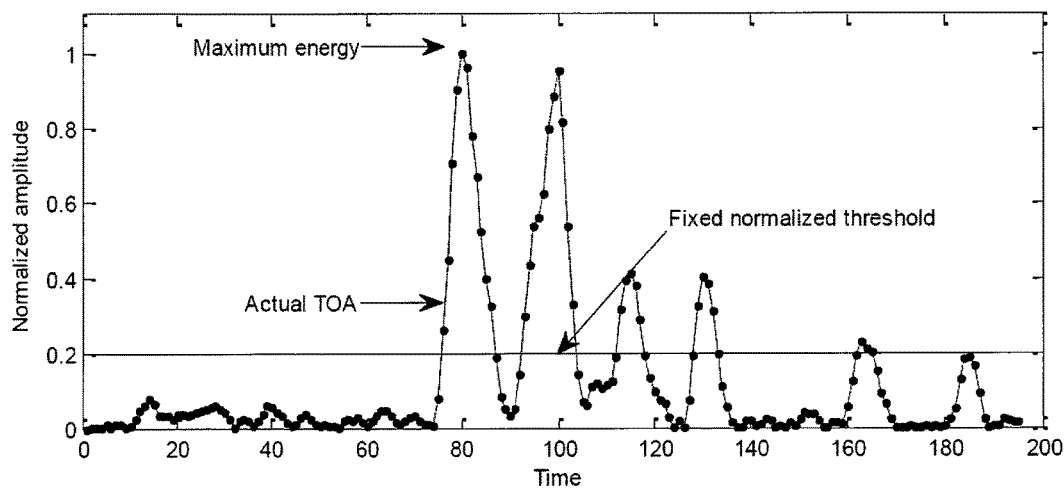
FIG. 8 shows an embodiment of an algorithm for determining the time of arrival of a sequence of pulses.

The ToA detector 16 is configured to estimate the time of arrival of the message received at the apparatus. There are several algorithms from the state of the art to detect the time of arrival. In one embodiment, the ToA of the signal can be estimated optimally by using a matched filter (MF) that is perfectly matched to the expected received multipath signal, by calculating the correlation of the received signal with the MF for several delays, and by choosing the delay of the matched filter which maximizes the correlation output. While such an approach can yield optimal ranging accuracies, they are typically not practical due to a number of a-priori knowledge requirements and/or implementation complexities. In one embodiment, low-complexity ToA estimation algorithms, suitable for fast and accurate ranging, typically employ threshold-based approaches where threshold search-based algorithms in the receiver compare incoming individual signal samples with a certain threshold in order to identify the first arriving multipath component and obtain the range information as shown in FIG. 8. Such algorithms use typically the channel impulse response (CIR) calculated in the CIR extractor 17. A threshold can be defined by using different signal statistics and a combination of these, such as the receiver noise level, maximum signal energy, etc. FIG. 8 shows an extracted channel impulse response, an example threshold and the ToA point being found (Actual TOA) on the basis of the CIR exceeding a threshold.

Apart from the advantages already described, the present embodiment has also the following advantages. Since the output the correlator 20 is a bipolar signal resulting from the combination of the I and the Q path of the signal, only one high-speed ADC (>500 MS/s) is required for time-of-arrival (ToA) determination. This brings a substantial advantage in terms of power consumption. Furthermore, since the composite RF signal contains very low energy in middle band, simple Zero-IF receiver architecture can be used (e.g. there is almost no DC energy in the down-converted signal which eases the amplification process in the baseband chain). In the latter Zero-IF architecture, the quadrature mixers 13 and 14 are actually part of the balanced quadricorrelation. The balanced quadricorrelator function (quadratic or linear-law) features an intrinsic band-pass filtering properties which increase the robustness of the ranging operation against interferers and unwanted signals (glitches). The method for determining the position and shape of each pulse combines the BFSK modulated pulses and therefore provides $2 \cdot (f_0 + BW/2)$ Hz of bandwidth (composite RF bandwidth, BW being the bandwidth of a single pulse and $f_0$ the offset frequency) for even more precise time-of-arrival estimation by taking benefit of the frequency diversity that the BFSK scheme brings. The output provides bipolar signals that can simultaneously carry data. Thus, the same structure and demodulation principle is used for communication and time-of-arrival measurement.

Even if the demodulator in FIG. 5 preserves the shape of the pulse envelope, it has the disadvantage to add a quadratic law distortion on the pulse envelope. For increased performance, especially for ranging and detection of weak first path in non-line-of-sight (NLOS) multipath conditions, the linear response of the demodulator has to be preserved (to keep the relative intensity of each of the multipath components between each other); the correlator 20 can additionally be enhanced by adding comparators as shown in the design in FIG. 6. The comparator 30, 31, 32 and 33 gives out a first value if the input signal is above a threshold and gives out a second value below that threshold. In one embodiment, the threshold value is zero.

The described embodiment, has the advantage that the quadrature mixers 13 and 14 and/or the correlator 20 demodulate the signal in the analogue domain. This reduces the amount of digital processing in the digital domain which is a dominant source for power consumption together with the ADC 16, especially if larger bandwidths (>1 GHz) (better ranging accuracy) are addressed. However, as described in relation to an alternative embodiment, a part of the processing (see FIG. 9) or all of the processing could be done in the digital domain.

Figure 9:
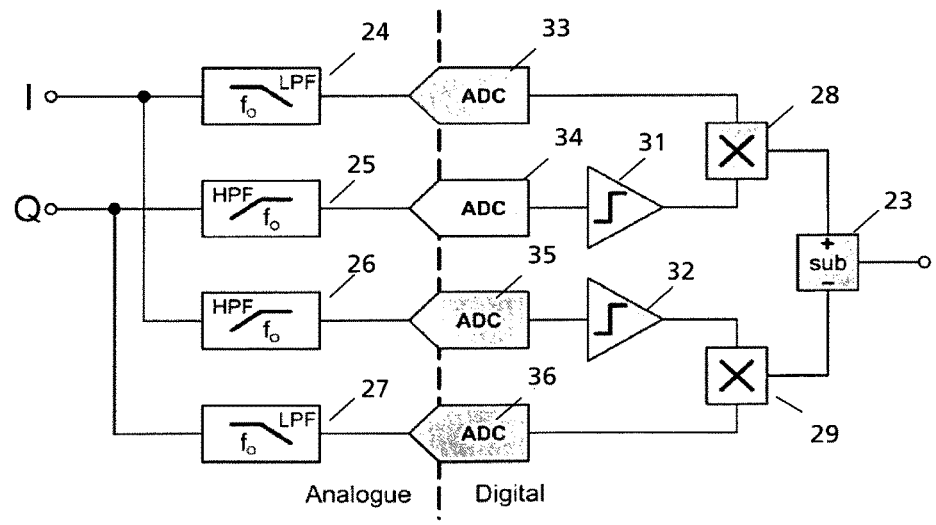
FIG. 9 shows an embodiment of the correlator of a second embodiment of the apparatus for determining the time of arrival.

Even if the desirable performance is well provided by the embodiments of the correlator 20 in FIG. 5 and FIG. 6, FIG. 9 shows an alternative embodiment, wherein the digitizing devices can be further optimized by placing them immediately after the phase delayers 24, 25, 26 and 27 in order to allow the multiplication 28 and 29, as well as the combiner function in 23 to be performed in the digital domain (optionally also the comparator function). The advantage of this realization is that it enables the use of lower resolution digitizing devices ADCs, compared to the digitizing device ADC in FIGS. 5 and 6. In this embodiment, the ADC can be reduced to digital sampling where n can be as low as 2. This brings also the advantage of inserting digital signal processing (e.g. notch filter to remove unwanted interferences) before the correlator).

The invention is not restricted to the described embodiment. Any variation in the scope of the claims is possible.

The invention claimed is:

1. Apparatus for determining a time of arrival of a message signal comprising:
   a first quadrature mixer for outputting an in-phase component of a received message signal by mixing the received message signal with the signal of a local oscillator, wherein the received message signal comprises a binary sequence modulated by binary frequency shift keying with pulses corresponding to a first value at a first frequency and with pulses corresponding to a second value at a second frequency, wherein the local oscillator has a frequency between the first frequency and the second frequency;
   a second quadrature mixer for outputting a quadrature component of the received message signal by mixing the received message signal with the signal of a local oscillator having the same frequency as the local oscillator of the first quadrature mixer with a phase offset of ninety degrees;
   a correlator; and
   a time of arrival detector for determining a time of arrival of the received message signal on the basis of the output of the correlator, wherein the correlator comprises:
a first cross-correlator,
a first delay means for delaying the phase of the output of the first quadrature mixer and/or for delaying the phase of the output of the second quadrature mixer before entering the first cross-correlator,
a second cross-correlator;
a second delay means for delaying the phase of the output of the first quadrature mixer and/or for delaying the phase of the output of the second quadrature mixer before entering the second cross-correlator; and
a combiner for combining the output of the first cross-correlator and the second cross-correlator,
wherein:
the first delay means comprises a first delayer configured to shift the phase of the output of the first quadrature mixer by 45° in a first direction and a second delayer configured to shift the phase of the output of the second quadrature mixer by 45° in a second direction, wherein the output of the first delayer and the output of the second delayer is mixed in the first cross-correlator: and/or
the second delay means comprises a third delayer configured to shift the phase of the output of the first quadrature mixer by 45° in the second direction and a fourth delayer configured to shift the phase of the output of the second quadrature mixer by 45° in the first direction, wherein the output of the third delayer and the output of the fourth delayer is mixed in the second cross-correlator.

2. Apparatus according to claim 1, wherein the combiner subtracts the output of the second cross-correlator from the output of the first cross-correlator.

3. Apparatus according to claim 1, wherein the first delay means and/or the second delay means is configured to move the relative phase of the output of the first quadrature mixer and of the output of the second quadrature mixer by 90°.

4. Apparatus according to claim 1 wherein the first delay means is configured to move the relative phase of the output of the first quadrature mixer and of the output of the second quadrature mixer in the first direction and/or the additional second delay means is configured to move the relative phase of the output of the first quadrature mixer and of the output of the second quadrature mixer in the second direction.

5. Apparatus according to claim 1, wherein the first delayer is a low pass filter removing the frequencies above an offset frequency, wherein the second delayer is a high pass filter removing the frequencies below the offset frequency, the third delayer is a high pass filter removing the frequencies above the offset frequency, wherein the second delayer is a low pass filter removing the frequencies below the offset frequency, wherein the offset frequency is half of the frequency difference between the first frequency and the second frequency.

6. Apparatus according to claim 1, wherein the correlator is a balanced quadricorrelator.

7. Apparatus according to claim 1, wherein the correlator comprises:
a comparator between the first delay means and the first cross-correlator with the output of the first quadrature mixer after the first delay means as input and/or a comparator between the second delay means and the first cross-correlator with the output of the second quadrature mixer after the second delay means as input; and an additional comparator between the third delay means and the second cross-correlator with the output of the first quadrature mixer after the second delay means as input and/or an additional comparator between the fourth delay means and the second cross-correlator with the output of the second quadrature mixer after the fourth delay means as input;
wherein the comparator and the additional comparator is configured to output a first comparator value, if the input signal is below a threshold and to output a second comparator value, if the input signal is above the threshold.

8. Apparatus according to claim 1, wherein the correlator comprises further:
a first analogue to digital converter and a second analogue to digital converter between the first delay means and the first cross-correlator for digitalizing the output of the first quadrature mixer after the first delay means and the output of the second quadrature mixer after the second delay means; and/or
an additional first analogue to digital converter and an additional second analogue to digital converter between the third delay means and the second cross-correlator for digitalizing the output of the first quadrature mixer after the third delay means and the output of the second quadrature mixer after the fourth delay means.

9. Apparatus according to claim 1 further comprising an analogue digital converter between the correlator and the time of arrival detector.

10. Apparatus according to claim 1 comprising a channel impulse response extractor configured to determine the channel impulse response on the basis of a number of last pulses received and of a number of pulses expected to receive, wherein the time of arrival detector is configured to determine the time of arrival of the received message signal on the basis of the determined channel impulse response.

11. Apparatus according to claim 10, wherein the channel impulse response extractor is configured to determine the channel impulse response by determining accumulated pulses of the number of the last pulses, wherein each pulse for which the second value is expected according to an expected binary sequence the pulse value is multiplied by minus one.

12. A key system comprising:
a key device configured to receive a challenge message and to transmit a challenge response on the basis of a key stored in the key device and of the challenge message received;
a base device configured to send the challenge message to the key device, to receive the challenge response from the key device and to validate the challenge response on the basis of the key stored also in the base device,
wherein the base device comprises an apparatus for determining the time of arrival of the challenge response comprising:
a first quadrature mixer for outputting an in-phase component of a received challenge response signal by mixing the received challenge response signal with the signal of a local oscillator, wherein the received challenge response signal comprises a binary sequence modulated by binary frequency shift keying with pulses corresponding to a first value at a first frequency and with pulses corresponding to a second value at a second frequency, wherein the local oscillator has a frequency between the first frequency and the second frequency;

a second quadrature mixer for outputting a quadrature component of the received challenge response signal by mixing the received challenge response signal with the signal of a local oscillator having the same frequency as the local oscillator of the first quadrature mixer with a phase offset of ninety degrees;

a correlator; and a time of arrival detector for determining a time of arrival of the received challenge response signal on the basis of the output of the correlator;

wherein the correlator of the base device comprises:
  a first cross-correlator,
    a first delay means for delaying the phase of the output of the first quadrature mixer and/or for delaying the phase of the output of the second quadrature mixer before entering the first cross-correlator,
  a second cross-correlator;
    a second delay means for delaying the phase of the output of the first quadrature mixer and/or for delaying the phase of the output of the second quadrature mixer before entering the second cross-correlator; and
  a combiner for combining the output of the first cross-correlator and the second cross-correlator,
  wherein:
    the first delay means comprises a first delayer configured to shift the phase of the output of the first quadrature mixer by 45° in a first direction and a second delayer configured to shift the phase of the output of the second quadrature mixer by 45° in a second direction, wherein the output of first delayer and the output of the second delayer is mixed in the first cross-correlator; and/or
    the second delay means comprises a third delayer configured to shift the phase of the output of the first quadrature mixer by 45° in the second direction and a fourth delayer configured to shift the phase of the output of the second quadrature mixer by 45° in the first direction, wherein the output of third delayer and the output of the fourth delayer is mixed in the second cross-correlator.

13. A key system according to claim 12, wherein the key device comprises an apparatus for determining the time of arrival of the challenge message, and wherein the key device is configured to send the challenge response at a known or predefined or fixed time period after the time of arrival of the challenge message and wherein the base device is configured to authenticate the challenge response received on the basis of a sending time of the challenge message, the time of arrival of the challenge response and the fixed time period.

14. A method for determining a time of arrival of a message comprising the following steps:
  mixing, in a first quadrature mixer, a received message signal with an oscillating signal for outputting an in-phase component of the received message signal, wherein the received message signal comprises a binary sequence modulated by binary frequency shift keying with pulses corresponding to a first value centred at a first frequency and with pulses corresponding to a second value centred at a second frequency, wherein the oscillating signal has a frequency between the first frequency and the second frequency;

mixing, in a second quadrature mixer, the received message signal with the signal of a local oscillator having the same frequency as the local oscillator of the first quadrature mixer with a phase offset of ninety degrees for outputting a quadrature component of the received message signal;

mixing, in a correlator, the output of the first quadrature mixer and the output of the second quadrature mixer; and determining a time of arrival of the received message signal on the basis of the output signal of the correlator, wherein the step of mixing the output of the first quadrature mixer and the output of the second quadrature mixer in the correlator comprises:

creating a first shifted signal by shifting the phase of the output of the first quadrature mixer by 45° in a second direction, creating a second shifted signal by shifting the phase of the output of the second quadrature mixer by 45° in a second direction, mixing, in a first cross-correlator, the first shifted signal and the second shifted signal to a first mixed signal, creating a third shifted signal by shifting the phase of the output of the first quadrature mixer by 45° in the second direction, creating a fourth shifted signal by shifting the phase of the output of the second quadrature mixer by 45° in the first direction, mixing, in a second cross-correlator, the third shifted signal and the fourth shifted signal to a second mixed signal, combining the first mixed signal and the second mixed signal.

15. Apparatus for determining a time of arrival of a message signal comprising:
  a first quadrature mixer for outputting an in-phase component of a received message signal by mixing the received message signal with the signal of a local oscillator, wherein the received message signal comprises a binary sequence modulated by binary frequency shift keying with pulses corresponding to a first value at a first frequency and with pulses corresponding to a second value at a second frequency, wherein the local oscillator has a frequency between the first frequency and the second frequency;
  a second quadrature mixer for outputting a quadrature component of the received message signal by mixing the received message signal with the signal of a local oscillator having the same frequency as the local oscillator of the first quadrature mixer with a phase offset of ninety degrees;
  a correlator comprising a cross-correlator configured to mix the output of the first quadrature mixer and the output of the second quadrature mixer;
  a time of arrival detector for determining a time of arrival of the received message signal on the basis of the output of the correlator; and
  a channel impulse response extractor configured to determine the channel impulse response on the basis of a number of last pulses received and of a number of pulses expected to receive, wherein the time of arrival detector is configured to determine the time of arrival of the received message signal on the basis of the determined channel impulse response, wherein the channel impulse response extractor is configured to determine the channel impulse response by determining accumulated pulses of the number of the last pulses, wherein each pulse for which the second value is expected according to an expected binary sequence the pulse value is multiplied by minus one.

\* \* \* \* \*